Patented Sept. 12, 1950

2,521,839

UNITED STATES PATENT OFFICE 2,521,839

REFRACTORY CASTING MOLD AND METHOD OF MAKING SAME

Roy C. Feagin, Flushing, N. Y., assignor to Austenal Laboratories, Incorporated, New York, N. Y., a corporation of New York No Drawing. Application August 11, 1949, Serial No. 109,809

8 Claims. (Cl. 22—189)

This invention relates to an improved binder for use in the production of refractory molds and to the resulting mold and the plastic mix and method for use in forming the mold.

The present application is a continuation-in-part of my copending application Serial No. 647,435, filed February 13, 1946, now abandoned, and the invention may be characterized as an improvement in the inventions described and claimed in Arthur B. Ray Patent No. 2,027,932, January 14, 1936, and Paul F. Collins Patent No. 2,380,945, August 7, 1945.

More particularly, this invention has to do with the production of refractory molds for use, in particular, in the casting of high temperature fusing metals and alloys, such as steel, stainless steels; non-ferrous alloys, such as stainless cobalt-chromium alloys; and other high temperature fusing materials, such as platinum, platinum-iridium, platinum-rhodium alloys, and the like.

In the casting of high temperature fusing alloys it is recognized that suitable refractory mold materials must be selected which will withstand the casting temperatures of the alloys. Silica has been one of the principal refractory constituents. Other refractory constituents have consisted of alumina, zirconia, ground silica-firebrick, ground magnesia-firebrick, fused magnesia, and many other materials already known to those familiar with this phase of the art of high temperature casting.

In addition to the proper selection of the refractory constituents to be used in making the molds, it is essential that a binder be present to bind together the refractory constituents.

Certain types of binders, such as the organic silicates and, more particularly, tetra-ethyl silicate and allied organic silicates, have been employed. While the use of such organic silicates as binders for refractory mold materials has advantages in the casting of relatively small parts, it also has certain disadvantages from the standpoint of large scale mass production of high precision castings. In the use of these organic silicates it is necessary, for example, to utilize ethyl alcohol, or acetone, or other mutual solvent as a diluent. When large volumes of investment are involved as in mass scale production, the fire hazard is great. Certain other disadvantages are present under similar conditions of operation, as, for example, the high basic cost of these organic silicates and the complicated technique required in formulating the processing of the necessary accessory ingredients along with the organic silicates in order to render them in such a condition as to be considered suitable as a binder.

Other types of binders, such as the colloidal silica solution, have advantages over the organic silicates, but they are not entirely free from free alkali which may react to lower the refractoriness of the mold mixture, and where used as a dipcoat for wax patterns they require more than one application of the dipcoat material. In addition it has been found that these colloidal silica solutions vary in their properties and are relatively unstable and change their characteristics upon storage. These changes may make them unsuitable as refractory mold binders.

One of the main objects of the present invention is to avoid the use of inflammable materials, complicated technique of formulation of the binder, and to utilize a relatively inexpensive material as a binder.

Another object of the invention is to provide along with the other advantages a binder with which it is possible to prepare two standard solutions and store them over long periods of time, with excellent stability, and prepare the binder on the premises at will, or as required for production use.

Another object of the invention is to provide a binder capable of more exacting control and which can be obtained in a regular manner and still be consistent.

Another object of the invention is to provide a binder which, where the mold mixture is used as a dipcoat, requires only one application of the dipcoat material.

Another object of the invention is to provide a binder which contains no free alkali.

Another object of the invention is to provide a binder which can be made by preparing two standard solutions, one, for example, of mineral acid and the other of alkali metal silicate; the binder being prepared by mixing these two solutions in suitable proportions to give a solution which has the desired binding power for the refractory filler. When the silicate solution is added to a mineral acid solution, silicic acid is formed.

The binder of the present application is a non-inflammable and very cheap material since it is prepared from water and such cheap materials as sodium silicate and a mineral acid such as hydrochloric acid. Tetraethyl silicate binder is formed by the hydrolysis of tetraethyl silicate, and during the reaction there is considerable heat evolved. There is always the danger of tetraethyl silicate binder boiling and causing a fire. The binder of the present application may be very accurately prepared each time to a definite mineral acid value which controls quite accurately the setting and gelling characteristics of the binder-investment mixture. This is accomplished by starting from previously standardized solutions which are mixed to accurate mineral acid values. This accuracy of control of setting and gelling characteristics is in direct contrast to the sodium silicate solution used as a binder. It has been very difficult in the past accurately to control setting times of sodium silicates since there is a tendency toward premature gel formation, lumpiness, or else extremely prolonged gelling times are obtained.

The binder of the present application contains no alkaline material such as sodium hydroxide, sodium silicate or the like which would reduce the refractoriness of the mold. Such alkaline materials tend to react with the refractory portion of the investment, causing low fusing eutectics to form at high temperatures, thus reducing the refractoriness of the investment. All of the alkaline sodium silicate used to prepare the binder is reacted with the acid to form neutral or acid salts.

The raw materials of the present binder are stable. For example, sodium silicate, if frozen, can be remelted again and used without harm to the resulting binder. However, in the case of colloidal silica solution, such as covered by the Paul F. Collins patent herein previously identified, if this solution is frozen, silica is precipitated and the binder thus cannot be used.

Original pattern coatings in use do not appear to be affected by the present binder in the secondary investment. For example, most of the dipcoats mentioned in the present application are essentially alkaline. The binder of this application is acid and, upon contact with the alkaline coating, apparently neutralization takes place, thereby stabilizing the coating. There appears to be no tendency for the coating to be washed away or dissolved by the binder. This is definitely a prime advantage since pure water and alkaline binders will wash away the coating mentioned in this application and the coatings which are ordinarily used in this work. The use of the present binder also eliminates the use of two coatings as in the case of the colloidal silica coatings.

Another advantage of the present binder over colloidal silica is the fact that it can be made uniform at all times. However, with colloidal silica there have been differences in alkaline content and gelling characteristics with various batches.

In using a standard sodium silicate solution as a binder for refractory molds, it has been found that in addition to reaction or washing of the dipcoat, there is also a tendency toward crust formation on the molds, causing extremely hardened sections of the mold and very soft portions of the mold. This tends to produce a non-uniform refractory mold. The binder of the present application does not appear to have these characteristics, and molds produced are uniform throughout.

Moreover, standard mineral acid and alkali metal silicate solutions can be standardized accurately in large quantity and stored for a long period of time. These solutions have practically indefinite shelf life and may be used at any time in preparing the desired binder.

Further objects and advantages of the invention will be apparent from the following detailed description.

In the production of refractory molds heretofore, it has been customary to use a suitable comminuted refractory material, such as silica, alumina, magnesia, titanium oxide, beryllium oxide, mullite, sillimanite, and zirconia, each alone according to its inertness to the conditions of use of the mold or in mixtures thereof which are inert and non-fluxing under the conditions of use. Such materials alone, or as suitable mixtures, are herein referred to as the refractory filler, of which silica in fine mesh of 80 to 300, for example, is suitable. The finer the mesh of the refractory filler the more suitable it is for giving a polished surface effect to the casting. The filler may be proportioned with various grain sizes to control the surface effect. The proportioning of the grain sizes may also be used to provide a mixture which can be packed efficiently on the vibrator, or to avoid shrinkage cracks.

As the explicit example of a binder in accordance with the present invention, an acid silicate binder is prepared by pouring a properly diluted solution of a water soluble alkali metal silicate, such as sodium silicate, potassium silicate, etc., into a rapidly mixed mineral acid solution of proper dilution.

To illustrate the preparation of an acid silicate binder, sodium silicate will be chosen as the water soluble alkali metal silicate and hydrochloric acid as the mineral acid. It is understood that any water soluble alkali metal silicate and mineral acid may be used within the scope of this invention and the use of sodium silicate as the water soluble alkali metal silicate and hydrochloric acid as the mineral acid in this illustration does not limit this invention to these two compounds in any way.

A solution of sodium silicate was prepared so that 25 ml. of this solution, when titrated with 1 N. HCl, require 28.00±.10 ml. with methyl orange as indicator.

A solution of hydrochloric acid was prepared so that 25 ml. of this solution, when titrated with 1 N. NaOH, required 38.00±.10 ml. with methyl orange as indicator.

50,000 ccs. of hydrochloric acid solution obtained above are measured into a mixing vessel equipped with a stirrer, and 53,000 ccs. of sodium silicate solution are poured slowly and with care into the acid solution while it is being stirred vigorously. The resultant liquid is the prepared binder and 100 ml., when titrated with 1 N. NaOH, requires 8.00±.10 ml. using methyl orange indicator.

The sodium silicate solution and the hydrochloric acid solution can be stored over relatively long periods of time without change, or with excellent stability. These solutions can be mixed to prepare the binder on the premises and at will, or as required for production use. The finished binder is low in cost, is non-inflammable, permits more exacting control, is free of free alkali which might react to lower the refractoriness of the mold mixture, and, where the mold mixture is used as a dipcoat, only one application of the dipcoat is required.

Another example is as follows:

A mineral acid solution is prepared from a mixture of 30% by volume of C. P. HCl and 70% by volume of water. The water soluble silicate solution is composed of 25% sodium silicate (comprising approximately 6.4% $Na_2O$ and 24.7%

SiO₂) and 75% water by volume. 25 ccs. of this acid solution are measured into a mixing vessel equipped with a stirrer, and 25 ccs. of the silicate solution are poured slowly and with care into the acid solution while it is being stirred vigorously. The resulting liquid is the prepared liquid binder.

Another example is as follows:

A mineral acid solution is prepared by adding 40% by volume of C. P. hydrochloric acid to 60 ccs. of water. A silicate solution is prepared comprising 50% sodium silicate (containing approximately 6.4% Na₂O and 24.7% SiO₂) and 50% water. A volume of this acid solution is measured into a mixing vessel equipped with a stirrer, and an equal volume of the silicate solution is poured slowly and with care into the acid solution while it is being stirred vigorously. The resulting liquid is the prepared liquid binder.

Another example is composed of the following:

A volume of 50% phosphoric acid solution is measured into a mixing vessel equipped with a stirrer, and an equal volume of silicate solution (mentioned in the above example) is poured slowly and with care into the acid solution while it is being stirred. The resulting liquid is the prepared liquid binder.

Another example is as follows:

A solution of sodium silicate is prepared, as in the first example, and in addition a solution of nitric acid is prepared of the same normality of HCl solution in the first example. 42,900 mls. of this nitric acid solution are measured into a mixing vessel equipped with a stirrer, and 53,300 mls. of sodium silicate solution are poured slowly and with care into the acid solution while it is being stirred. This forms a prepared liquid binder having an acid value of 10.1 using methyl orange indicator.

The following is an example of another type of binder using sulphuric acid as the acidifying agent for the sodium silicate. The sodium silicate solution was prepared from 40 parts S brand sodium silicate (3.9:1 ratio of silica to alkali). This is mixed with 60 parts of water, thoroughly stirred; 25 ccs. of this solution were titered against 1 N-hydrochloric acid solution in the presence of methyl orange indicator until 28≠.1 cc. of hydrochloric acid were used.

The sulphuric acid solution was prepared by adding 81 ccs. of concentrated sulphuric acid, specific gravity 1.84 to 1920 ccs. of water; 25 ccs. of this acid solution were titered against 1 N-sodium hydroxide in the presence of methyl orange indicator until 38.0≠.1 cc. of the alkali were used.

In preparing the sulphuric acid binder, 500 ccs. of the standardized acid solution were placed into a container to which were added 565 ccs. of the standardized sodium silicate solution. This was added very slowly with rapid stirring to prevent gelation. The solution was adjusted by addition of standardized sodium silicate solution until 100 ccs. of the binder required 8.5≠.1 cc. of 1 N sodium hydroxide solution. This was then ready for use.

The foregoing binder was used with an investment to invest patterns which had been dipped in the dipcoat disclosed herein as Example F, as well as with patterns using the sodium silicate bonded dipcoat also disclosed herein.

In addition to sulphuric acid binder, there has also been prepared a phosphoric acid binder. The standard phosphoric acid solution was made from 177 ccs. of 85% phosphoric acid, mixed with 1825 ccs. of water; 25 ccs. of this acid solution were titered against 1 N sodium hydroxide in the presence of methyl orange indicator, and adjusted until 38.0+.1 cc. of 1 N NaOH was used; 500 ccs. of this standardized phosphoric acid solution were then placed into a container and 585 ccs. of the standardized sodium silicate solution were slowly added with rapid stirring to prevent gelation. The final binder was adjusted until 100 ccs. of the finished binder required 8.7≠.1 cc. 1 N sodium hydroxide for neutralization. The binder was then used with the same two dipcoats mentioned above.

Castings made utilizing the above binders were very smooth and entirely satisfactory. The castings were made of a cobalt-chromium alloy marketed by Austenal Laboratories, Inc. under their trade-mark "Vitallium."

In the copending application of Roy C. Feagin and Eric H. Zahn, Serial No. 538,166, filed May 31, 1944 (now United States Patent No. 2,441,695, issued May 18, 1948), and in applicant's copending application Serial No. 613,889, filed August 31, 1945, now Patent No. 2,491,096, issued Dec. 13, 1949, there is disclosed and claimed steps in the coating of the casting surfaces of refractory molds which comprise forming a wax or other destructible pattern, coating the pattern with a refractory binder mixture, for example, by dipping the pattern therein to form a uniform and smooth coating on the pattern, drying the coating, surrounding the coated pattern with an investment composition composed of a refractory and the binder mentioned in the preceding examples, bonding the coating to the mold, and eliminating the pattern.

In order to produce material according to the present invention for the above mentioned coating or dipcoat, the coating material is prepared by mixing a suitable quantity of comminuted refractory material with the sodium silicate binder. I prefer to use, as the refractory material or refractory filler, silica finely ground—for example, to approximately 200 mesh, or finer. The use of a finely ground refractory material produces a smooth coating which results in a casting having a high degree of surface smoothness and possessing the maximum of detail present in the pattern itself. Other refractory materials—such as fused quartz, fused alumina, zircon, zirconia, mullite, fused magnesia, and the like—may be employed.

In order to produce a coating which will be flexible to the desired extent, glycerine is preferably employed in the refractory mix for forming the primary investment coating. Due to its hygroscopic character it prevents rapid drying of the coating and, subsequently, the cracking and peeling of the coating from the pattern. The best range of this constituent is from approximately 0% to approximately 20% of the liquid content of the mix.

The sodium silicate binder is preferably employed in quantity sufficient to add strength to the refractory mix, both in the dried stage and in the fired stage, preparatory to receiving the molten metal or alloy. While it is not highly desirable to use an excessive amount of sodium silicate in the coating, this substance should constitute at least approximately 10%, and preferably from approximately 10% to approximately 40%, of the liquid constituent.

Hydrochloric acid is preferably added to the mix as a partial or total setting or gelling agent for the binder. It reacts with the sodium silicate to form a hydrous silicic acid gel. Other mineral acids may be used, such as nitric, sulphuric, phosphoric, and the like. The presence of a small amount of mineral acid is indicated as highly desirable. The mineral acid content may be varied from 0% to approximately 25% of the liquid content of the refractory mix which forms the primary investment coating.

After acid solution is added to the silicate solution to form the acid silicate binder it is noted that gelling or lumps form in the solution which makes it unsatisfactory for use. This is because the solution changes from a basic to an acid solution, passing through a neutral point, and this is the point at which gelation takes place.

For the purpose of assuring a smooth coating of the pattern with the refractory mix, a wetting agent, such as "Wetanol," sulfatate, a hydrocarbon sulfonate, or the like, is preferably used in the mix. The range of such substance may vary from approximately .01% to approximately 10.0% of total weight. "Aerosol" OT (sodium dioctyl sulfo-succinate), "Tergitol" (sulphate of higher alcohols) or the like may be used as disclosed in the Feagin and Zahn patent above identified. Excessive use of the wetting agent may form bubbles in the coating composition, resulting in rough castings, and therefore should be avoided.

In order to minimize bubble formation in the mixture and in the coating on the pattern, a defoaming agent is preferably employed in the mix. Octyl alcohol is a suitable defoaming agent, but other defoaming agents, such as Foamex (mixture of aliphatic esters), may be used. The percentage of this ingredient may vary from approximately .01% to approximately 1.0%.

One typical composition embodying the present invention and suitable as the refractory coating mix in accordance with the Feagin and Zahn patent and the Feagin application, above identified, is as follows:

*Example A*

| | | |
|---|---|---|
| Flint | lbs | 23 |
| Water | cc | 2830 |
| Glycerin | cc | 225 |
| Sodium silicate, concentrated | cc | 1350 |
| HCl solution (10% in water) | cc | 650 |
| Wetanol solution (7½% in water) | cc | 75 |
| Octyl alcohol | cc | 5 |

Another composition embodying the present invention and suitable as the refractory coating mix is as follows:

*Example B*

| | | |
|---|---|---|
| Flint | lbs | 23 |
| Water | cc | 2900 |
| Glycerin | cc | 450 |
| Sodium silicate, concentrated | cc | 900 |
| HCl solution (10% in water) | cc | 650 |
| Octyl alcohol | cc | 3 |
| Wetanol solution (7½% in water) | cc | 75 |

Another composition embodying the present invention and suitable as the refractory coating mix is as follows:

*Example C*

| | | |
|---|---|---|
| Water | cc | 290 |
| Glycerin | cc | 45 |
| Sodium silicate, concentrated | cc | 180 |
| Octyl alcohol | cc | 0.3 |
| Wetanol solution (7½% in water) | cc | 7.5 |
| Potter's flint | lbs | 2.4 |

Another composition suitable as the refractory coating mix, particularly where the acid silicate binders are used in the secondary investment, is as follows:

*Example D*

| | |
|---|---|
| Solution 15 | 380 grams (45 volumes amyl triethoxy-silane; 81 volumes condensed ethyl silicate; 78 volumes proprietary alcohol; 12.5 volumes 1% hydrochloric acid) |
| Glycerine | 40 grams |
| Flint | 2 lbs. |
| Secondary octyl alcohol | 2 drops |
| Wetting agent | 1 cc |

Another composition suitable as the refractory coating is as follows:

*Example E*

| | | |
|---|---|---|
| Water | cc | 290 |
| Glycerin | cc | 45 |
| Water glass | cc | 180 |
| Ammonium alginate solution (6% in water) | cc | 15 |
| Octyl alcohol | cc | 0.3 |
| Wetanol solution (7½% in water) | cc | 7.5 |
| Potter's flint | lbs | 2.4 |

Another composition suitable as the refractory coating mix is as follows:

*Example F*

| | | |
|---|---|---|
| Water | cc | 290 |
| Glycerin | cc | 45 |
| Water glass | cc | 90 |
| Hydrochloric acid (4.42% by weight) | cc | 65 |
| Ammonium alginate solution (6% in water) | cc | 15 |
| Octyl alcohol | cc | 0.3 |
| Wetanol solution (7½% in water) | cc | 7.5 |
| Potter's flint | lbs | 2.3 |

Another composition suitable as the refractory coating mix is as follows:

*Example G*

| | | |
|---|---|---|
| Water | cc | 290 |
| Glycerin | cc | 45 |
| Water glass | cc | 90 |
| Hydrochloric acid (4.42% by weight) | cc | 65 |
| Ammonium alginate solution (6% in water) | cc | 15 |
| Octyl alcohol | cc | 0.3 |
| Wetting agent (7½% in water) | cc | 7.5 |
| Zircon (milled approximately—150 mesh) | lbs | 3.75 |

Another composition suitable as the refractory coating mix is as follows:

*Example H*

| | | |
|---|---|---|
| Water | cc | 290 |
| Glycerin | cc | 45 |
| Water glass | cc | 180 |
| Ammonium alginate solution (6% in water) | cc | 15 |
| Octyl alcohol | cc | 0.3 |
| Wetting agent (7½% in water) | cc | 7.5 |
| Zircon (milled approximately—150 mesh) | lbs | 3.75 |

Another composition suitable as the refractory coating mix is as follows:

Example I

| | | |
|---|---|---|
| Water | cc | 290 |
| Glycerin | cc | 45 |
| Water glass | cc | 90 |
| Hydrochloric acid (4.42% by weight) | cc | 65 |
| Ammonium alginate solution (6% in water) | cc | 15 |
| Octyl alcohol | cc | 0.3 |
| Wetting agent (7½% in water) | cc | 7.5 |
| Electrically fused zirconium oxide (approximately—325 mesh) | lbs | 2.75 |

Another composition suitable as the refractory coating mix is as follows:

Example J

| | | |
|---|---|---|
| Water | cc | 290 |
| Glycerin | cc | 45 |
| Water glass | cc | 90 |
| Hydrochloric acid (4.42% by weight) | cc | 65 |
| Ammonium alginate solution (6% in water) | cc | 15 |
| Octyl alcohol | cc | 0.3 |
| Wetting agent (7½% in water) | cc | 7.5 |
| Zircon (approximately—325 mesh) | lbs | 1.5 |
| Fused alumina (approximately 450 mesh) | lbs | 1.5 |

The following is another general example of a pattern coating or dipcoat embodying the present invention which is characterized by the use of ready prepared acid solution binder to which is added the refractory ingredient, wetting agent, and other materials to form the coating:

Example K

| | | |
|---|---|---|
| Fraxbond binder (i. e. binder disclosed herein) | cc | 500 |
| Glycerin | cc | 70 |
| 1% high-test gelatin in water | cc | 20 |
| Secondary octyl alcohol | cc | 1 |
| Wetanol solution (10% in water) | cc | 10 |
| 300 mesh flint | grams | 1700 |

Coatings, Examples C, E, and H, as set forth above, do not use any acid in the dipcoat. The presence of a mineral acid in the coating is desirable but is not necessary to the proper functioning of the coating, particularly when the acid silicate binder is used in the secondary investment.

Most of the coatings in which sodium silicate is used as the binder in the dipcoat are on the alkaline side. Thus, when the acid silicate binder—for example, in the secondary investment—comes in contact with the coating during the investing operation, as will herein appear, it has a tendency to set the coating fairly rapidly, since there is a neutralization of the alkali in the coating which takes place, and in so neutralizing, silicic acid gel is formed in the coating which stabilizes the coating on the patterns.

After the constituents are combined and thoroughly mixed, the pattern (not shown) is completely coated with the coating material as shown and described in the copending applications above identified. After the pattern has been thoroughly coated with the primary investment material, and while the coating is still wet, the surface is preferably thoroughly covered, for example, by sprinkling it with refractory (preferably flint, silica or the like) in coarse particle form, graded from approximately 50 to 100 mesh, as further disclosed in the previously mentioned copending application and patent.

After the pattern is coated and "sanded" and the coating has dried, a suitable mold or refractory material is formed about the pattern, and thereafter the pattern is eliminated by heat, leaving the refractory mold having a cavity with a smooth and hard surface in which the high fusing metal or alloy is adapted to be cast with excellent results.

The secondary investment material used in forming the body of the mold may be, in general, any suitable refractory filler and the binder of the present application. The refractory filler may be in comminuted form—silica, flint, or any other refractory materials well known in the art.

For examples of refractory portions for use with the coating or dipcoat composition, attention is directed to the disclosure in my copending application previously identified. Reference is hereby also made to the previously identified patent of Roy C. Feagin and Eric H. Zahn for such further variations and details as may be employed in connection with the present invention.

The refractory filler for the secondary investment may be any of the refractory fillers previously set forth, or any other suitable refractory filler. Silica in fine mesh, of 80 to 300 for example, is suitable. The filler may be proportioned with various grain sizes to control the surface effect. The proportioning of the grain sizes may also be used to provide a mixture which can be packed efficiently on the vibrator or to avoid shrinkage cracks.

The embodiments of the invention described in the specification are for illustrative purposes only, and it is to be expressly understood that the accompanying specification is not to be construed as a definition of the limits or scope of the invention, reference being had to the appended claims for that purpose.

I claim:

1. The combination with a refractory mold body formed of a comminuted refractory material mixed with a binder of acid character comprising the reaction products formed by adding an aqueous solution of an alkali metal silicate to an aqueous solution of a mineral acid, of a coating on the casting surface of the mold body and in intimate contact therewith, said coating being formed of a comminuted refractory material and an aqueous solution of an alkali metal silicate which reacts with said binder to form a hydrated silicic acid bonding medium for said mold body and said coating.

2. The method of producing an improved refractory mold which comprises coating a pattern with a mixture of comminuted refractory material and a binder having the characteristic of resistance to washing away from the pattern by reaction products of acid character formed by adding an aqueous solution of an alkali metal silicate to an aqueous solution of a mineral acid, then applying in intimate contact with said coating a mold body forming mixture of comminuted refractory material and a binder of acid character comprising the reaction products formed by adding an aqueous solution of an alkali metal silicate to an aqueous solution of a mineral acid, permitting said reaction products to gel to form a hydrated silicic acid bond for the comminuted refractory material, and drying the refractory mold to convert the hydrated silicic acid to silica to effect a bond between the comminuted refractory particles of the mold body and between the mold body and the coating.

3. The method according to claim 2, wherein the binder for the coating comprises the reaction products of an aqueous alkali metal silicate solution and an aqueous solution of a mineral acid, the reaction products of the coating being of alkaline character.

4. The method according to claim 2, wherein the binder for the coating is formed from an aqueous alkali metal silicate solution.

5. A refractory mold comprising, in combination, a mold body, and a coating forming the casting surface for said mold body, said coating comprising a comminuted refractory material and a binder having the characteristic of resistance during application of the mold body to washing away by reaction products of acid character formed by adding an aqueous solution of an alkali metal silicate to an aqueous solution of a mineral acid, said mold body comprising a comminuted refractory material and a silica binder formed by the reaction of an aqueous solution of an alkali metal silicate and an aqueous solution of a mineral acid, said solution reaction products being of an acid character, said coating being in intimate contact with the mold body.

6. A refractory casting mold according to claim 5, wherein the coating comprises a comminuted refractory material and a silica binder formed from the reaction products of an aqueous solution of an alkali metal silicate and an aqueous solution of a mineral acid, said solution reaction products being of an alkaline character.

7. A refractory casting mold according to claim 5, wherein the coating comprises a comminuted refractory material and a silica binder formed by the setting action of an aqueous solution of alkali metal silicate.

8. A refractory casting mold according to claim 5, wherein the coating comprises a comminuted refractory material and a binder comprising the reaction products of amyltriethoxysilane, ethyl silicate, alcohol, mineral acid and water.

ROY C. FEAGIN.

REFERENCES CITED

The following references are of record in the file of this patent:

UNITED STATES PATENTS

| Number | Name | Date |
| --- | --- | --- |
| 1,674,558 | Miller | June 19, 1928 |
| 1,748,315 | Stoewener | Feb. 25, 1930 |
| 2,027,932 | Ray | Jan. 14, 1936 |
| 2,333,679 | Schoonover | Nov. 9, 1943 |
| 2,368,322 | Passelecq | Jan. 30, 1945 |
| 2,388,299 | Thielemann | Nov. 6, 1945 |
| 2,441,695 | Feagin | May 18, 1948 |